United States Patent
Fujimoto et al.

(10) Patent No.: US 7,882,136 B2
(45) Date of Patent: Feb. 1, 2011

(54) FORESIGHT DATA TRANSFER TYPE HIERARCHICAL STORAGE SYSTEM

(75) Inventors: Kazuhisa Fujimoto, Koganei (JP); Naoto Matsunami, Hayama (JP); Hirotoshi Akaike, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 12/052,900

(22) Filed: Mar. 21, 2008

(65) Prior Publication Data

US 2008/0294698 A1 Nov. 27, 2008

(30) Foreign Application Priority Data

May 23, 2007 (JP) ............................. 2007-136119

(51) Int. Cl.
*G06F 17/00* (2006.01)

(52) U.S. Cl. .................. 707/792; 707/795; 707/803; 707/804; 707/805

(58) Field of Classification Search ............ 707/792, 707/795, 803, 804, 805
See application file for complete search history.

(56) References Cited

U.S. PATENT DOCUMENTS

| 5,440,737 | A | 8/1995 | Uchinuma |
| 5,564,307 | A | 10/1996 | Uryu |
| 5,619,690 | A | 4/1997 | Matsumani et al. |
| 7,290,168 | B1* | 10/2007 | DeKoning ................ 714/9 |
| 2006/0010230 | A1* | 1/2006 | Karklins et al. ............ 709/223 |
| 2006/0010341 | A1 | 1/2006 | Kodama |
| 2006/0069689 | A1* | 3/2006 | Karklins et al. ............ 707/100 |
| 2006/0085570 | A1 | 4/2006 | Hosoya et al. |
| 2006/0112253 | A1 | 5/2006 | Takeda et al. |
| 2006/0129654 | A1 | 6/2006 | Sato |
| 2007/0050589 | A1 | 3/2007 | Tanaka et al. |
| 2007/0079156 | A1 | 4/2007 | Fujimoto et al. |
| 2008/0120129 | A1* | 5/2008 | Seubert et al. ................ 705/1 |
| 2009/0003172 | A1* | 1/2009 | Yahata et al. ............ 369/53.41 |

FOREIGN PATENT DOCUMENTS

| CN | 1184538 A | 6/1998 |
| EP | 1 916 595 | 4/2008 |
| JP | 07-84840 A | 3/1995 |
| JP | 2001-273176 | 10/2001 |
| JP | 2003-140938 A | 5/2003 |
| JP | 2003-263279 | 9/2003 |
| JP | 2004-70403 | 3/2004 |
| JP | 2004-227594 | 8/2004 |
| JP | 2005-122765 | 5/2005 |
| JP | 2005-228245 | 8/2005 |
| JP | 2006-244527 | 9/2006 |
| JP | 2006-294052 | 10/2006 |
| JP | 2007-102322 | 4/2007 |

* cited by examiner

*Primary Examiner*—Sana Al-Hashemi
(74) *Attorney, Agent, or Firm*—Mattingly & Malur, P.C.

(57) ABSTRACT

A storage system includes a file server connected with a plurality of computers, and a second storage device connected with a first storage device, in which the second storage device has a second volume; the first storage device has a virtual volume virtualized with a first volume and the second volume as a self-device possessed volume; and the file server mounts the first volume as a first directory, mounts the virtual volume as a second directory, and copies predetermined files in the second directory into the first directory.

15 Claims, 10 Drawing Sheets

234 : CALCULATION-EXECUTING SCRIPT

FIG.10

FORESIGHT DATA TRANSFER TYPE HIERARCHICAL STORAGE SYSTEM

INCORPORATION BY REFERENCE

The present application claims priority from Japanese application JP2007-136119 filed on May 23, 2007, the content of which is hereby incorporated by reference into this application.

BACKGROUND OF THE INVENTION

The present invention relates to a storage system for storing data of computers (or servers), and particularly to a storage system including a plurality of storage devices which are constituted by a tiered structure, and each of the storage devices is constituted by a plurality of disk devices. It also relates to a method for a data transfer between the tiered storage devices in the storage system connected with a NAS (Network Attached Storage) for input/output of files, and allocation of volumes provided by the tiered storage devices to directories provided by the NAS.

In these years, the improvement of computational performance has been achieved remarkable breakthrough by a HPC (High Performance Computing) purpose computer or a supercomputer. In a few years, it is predicted that a supercomputer will appear with a computational performance of a Peta FLOPS (Floating Operation Per Second) class, and will also appear with a still better computational performance of an Exa FLOPS class, about ten years after. With this improvement, it is also predicted that a magnitude of calculation for such as scientific calculations performed by using the supercomputer will become large, and individual file sizes to be inputted and outputted to/from the supercomputer will also become large from GB (Giga Byte) to TB (Tera Byte) order. Therefore, it is predicted that a storage system to be connected with the supercomputer will require a capacity ranging from PB (Peta Byte) to EB (Exa Byte) class. Further, it is assumed that an I/O processing performance for the storage device will require to be improved to the extent of 1 to 2 orders from the present performance because of a necessity for performing the input/output of the TB class files in high speed.

Conventionally, in the case of a storage system used for the supercomputer, midrange-class storage devices having a good cost performance are provided in correspondence with the number of nodes in the supercomputer and operated in parallel to obtain an I/O processing performance of the storage devices suitable for the I/O processing performance requested by servers or computers.

Further, performance requirements are various to be requested for the storage devices used for the supercomputer, that is, a high sequential performance is demanded to input/output large-sized files in high speed, and a high transaction performance is also demanded to input/output a number of files simultaneously.

For a purpose of responding to the performance requirements described above, JP-A-2004-70403 has disclosed a technique such that volumes storing files are distributed in response to a performance requested from computers or applications. According to a method in the document, file storing requirements for every business application (requirements of a performance, reliability, etc. to be requested for volumes for storing files) are determined in advance. Further, the side of storage devices provides a table having a specification of the performance etc. itself for a file-storing volume in advance. The foregoing table is then referred to every file in every storing requirement of the application to distribute storing destination volumes.

SUMMARY OF THE INVENTION

In the case of a storage system used for the supercomputer, it has been required to constitute the storage system so that an input/output for a large size file and a number of files are performed in high speed and a large capacity system is realized in low cost.

However, if a large scale system having a capacity of PB to EB classes to be required in the future is constituted by a plurality of conventional midrange class storage devices, it is required to install over several hundred to thousand units in order to realize a necessary performance. Therefore, a problem arises such that it is difficult to provide a low price system.

Further, if the various performance requirements for the storage system used for the supercomputer are attempted to be processed by the related technique disclosed in JP-A-2004-70403, as a corresponding method to solve the foregoing problem, there arises the following problem. That is, in the case where the files distributed into the file-storing volumes adapted to characteristics for the individual files are stored by the foregoing related technique so that speeding up is attempted to be facilitated for the input/output of the files, it is difficult to determine necessary requirements for the performance and reliability relative to the file-storing volume for every calculation in advance, since the type of files used for the input/output are great variety in respect to programs of the scientific calculations etc. to be executed by the supercomputer.

In order to achieve the foregoing object, the present invention provides a storage system including a file server connected with a plurality of computers, a first storage device connected with the file server, a second storage device connected with the first storage device, and a storage management device connected with the file server, first storage device and second storage device, in which the first storage device has a first volume formed on a magnetic disk device resided in the device itself, the second storage device has a second volume formed on a magnetic disk device resided in the device itself, the first storage device has a virtual volume as being a self-device possessed volume virtualized with the second volume, and the file server mounts the virtual volume as a second directory and the first volume as a first directory at a predetermined first timing, copies predetermined files in the second directory into the first directory, and copies predetermined files in the first directory into the second directory at a predetermined second timing.

The storage management device includes means that collects calculation-executing job information of the computer, means that analyzes the calculation-executing job information, and means that determines the first and second timings.

The storage management device further includes means that extracts a characteristic of the files to be inputted/outputted for a calculation from the calculation-executing job information, and means that selects the first volume to store the files, in which the file server mounts the selected first volume as the first directory. Here, the means that selects the first volume to store the files selects the first volume constituted by the magnetic disk devices, the number of which is equal to or greater than a predetermined second value, in the case where a file size is larger than a predetermined first value.

Further, the means that selects the first volume to store the files selects a volume, the number of which is equal to or greater than a predetermined fourth value in the case where the number of files is larger than a predetermined third value, and the file server mounts the selected plurality of first volumes as the individual first directories and copies dispersedly the plural files into the plurality of first directories.

Furthermore, the file server copies predetermined files resided in the first directory into the second directory at the predetermined second timing, thereafter, unmounts the first directory to provide the unmounted first volume as a file-storing volume used for the other calculations.

According to the invention, the storage system has both high performance and large capacity demanded by a supercomputer and can be realized by the minimum number of storage devices.

The other objects, features and advantages of the invention will become apparent from the following description of the embodiments of the invention taken in conjunction with the accompanying drawings.

DETAILED DESCRIPTION OF THE INVENTION

First Embodiment

Figure 1:
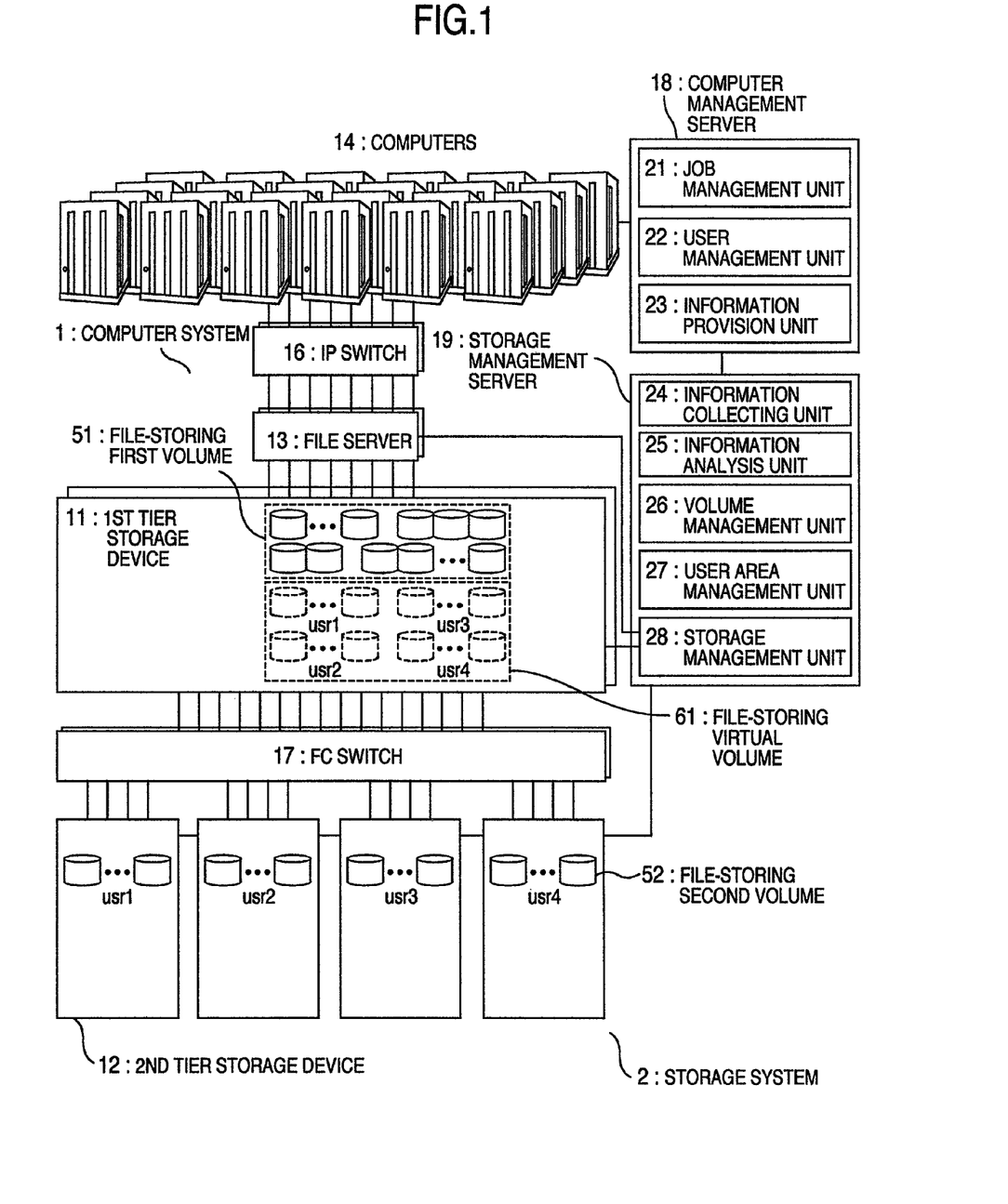
FIG. 1 is a constitutional diagram showing a storage system connected with computers and management servers in a first embodiment of the invention.

FIG. 1 is a constitutional diagram showing an example of a storage system including storage devices in a first embodiment. A computer system 1 includes a storage system 2, an IP switch 16, computers 14, and a computer management server 18. The storage system 2 includes a file server 13, a 1st tier storage device 11, a 2nd tier storage device 12, a fiber channel switch (FC) 17, and a storage management server 19.

As shown in FIG. 1, the file server 13 is connected with the computers 14 via the IP switch 16 so that the storage system 2 is connected with the computers 14. Further, the computer management server 18 is connected directly with the storage management server 19, or connected with each the other via a LAN (Local Area Network). The storage management server 19, file server 13, 1st tier storage device 11, and 2nd tier storage device 12 are directly connected with each the other, or connected via the LAN.

The 1st tier storage device 11 is directly connected with the file server 13. As a connection interface to be used in this case, it is common to use an interface of protocol for transferring block data by such as a fiber channel, iSCSI, etc. Here, the 1st tier storage device 11 is acceptable even if it is connected with the file server 13 via a switch.

The 2nd tier storage device 12 is connected to the 1st tier storage device 12 via the FC switch 17. A connection interface to be used in this case is acceptable even if an interface of protocol for transferring the block data adapted to the ISCSI etc. is used the other than the fiber channel.

The 1st tier storage device 11 has a file-storing first volume 51 for storing files which are subject to an input/output process by the file server 13. The 2nd tier storage device 12 has a file-storing second volume 52 for storing files which are subject to the input/output process by the file server 13. Further, the 1st tier storage device 11 has a virtualization function for virtually providing a file-storing virtual volume 61, a volume resided in the 2nd tier storage 12 which stores a volume and files of the 1st tier storage device 11 provided for the computers 14.

Figure 2:
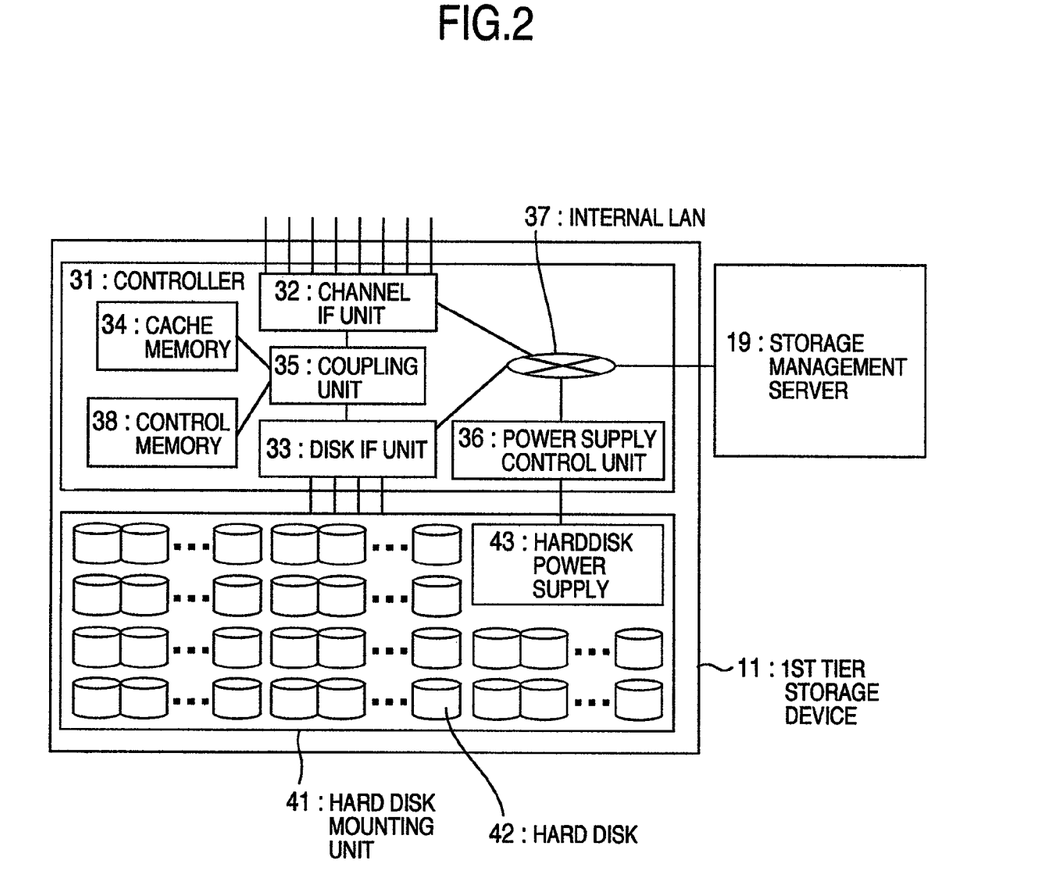
FIG. 2 is a constitutional diagram showing a 1st tier storage device in the invention.

FIG. 2 is a constitutional diagram showing an example of the 1st tier storage device 11. A controller 31 has: a channel IF (interface) unit 32 for controlling a data write/read access from a high-order device, such as the file server 3, computers 14, etc.; a disk IF unit 33 connected with a plurality of hard disks 42, for controlling the data write/read access to the hard disks 42; a cache memory 34 for temporarily storing write/read data in the hard disks 42; and a coupling unit 35 for connecting the channel IF unit 32, disk IF unit 33 and cache memory 34 with each the other. The coupling unit 35 is constituted by one or more switches in general, however, it is acceptable even if the coupling unit 35 is constituted by one or more common buses.

The channel IF unit 32 controls a data transfer between the high-order device and cache memory 34 when it receives the data write/read access from the high-order device. The disk IF unit 33 controls a data transfer between the hard disks 42 and cache memory 34 when data is written and read to/from the hard disks 42. In this way, the data is exchanged between the channel IF unit 32 and disk IF unit 33 via the cache memory 34 so that the data write/read is performed to the hard disks 42 from the high-order device. For a purpose of the foregoing controls, both the channel IF unit 32 and disk IF unit 33 have one or more processors (not shown), respectively. These processors are connected to an internal LAN 37. Further, the storage management server 19 resided outside of the storage device is connected to the internal LAN 37.

Here, the constitution of the foregoing controller 31 is simply an example, therefore, the constitution is not limited to the foregoing example. The controller 31 may be acceptable if it has a function of the data write/read to and from the hard disks 42 in response to the data write/read request from the computers 14.

Further, the controller 31 may have a power supply control unit 36 for controlling a power supply to turn the hard disks 42 on/off-state (supply/shutoff). In this case, the power supply control unit 36 is connected to the internal LAN 37.

A hard disk mounting unit 41 has the hard disks 42 and a hard disk power supply 43 for supplying the power to the individual hard disks 42. The hard disks 42 are grouped with RAID groups (Gr.), each of which constitutes the plural hard disks 42.

Here, the hard disk power supply 43 is acceptable even if it is provided to the extent of one or two (in the case of containing a redundant configuration) units for each of the hard disk 42 or of the RAID groups.

The power supply control unit 36 in the controller 31 is connected with the hard disk power supply 43 to control the on/off of power supply.

Here, the power supply control unit 36 is acceptable even if it is not provided in the controller 31, but in the hard disk mounting unit 41. Further, the power supply control unit 36 may also be connected directly with the storage management server 19.

The file-storing first volume 51 described with reference to FIG. 1 is formed on an area of the RAID group (Gr.) constituted by the plural hard disks 42.

Figure 3:
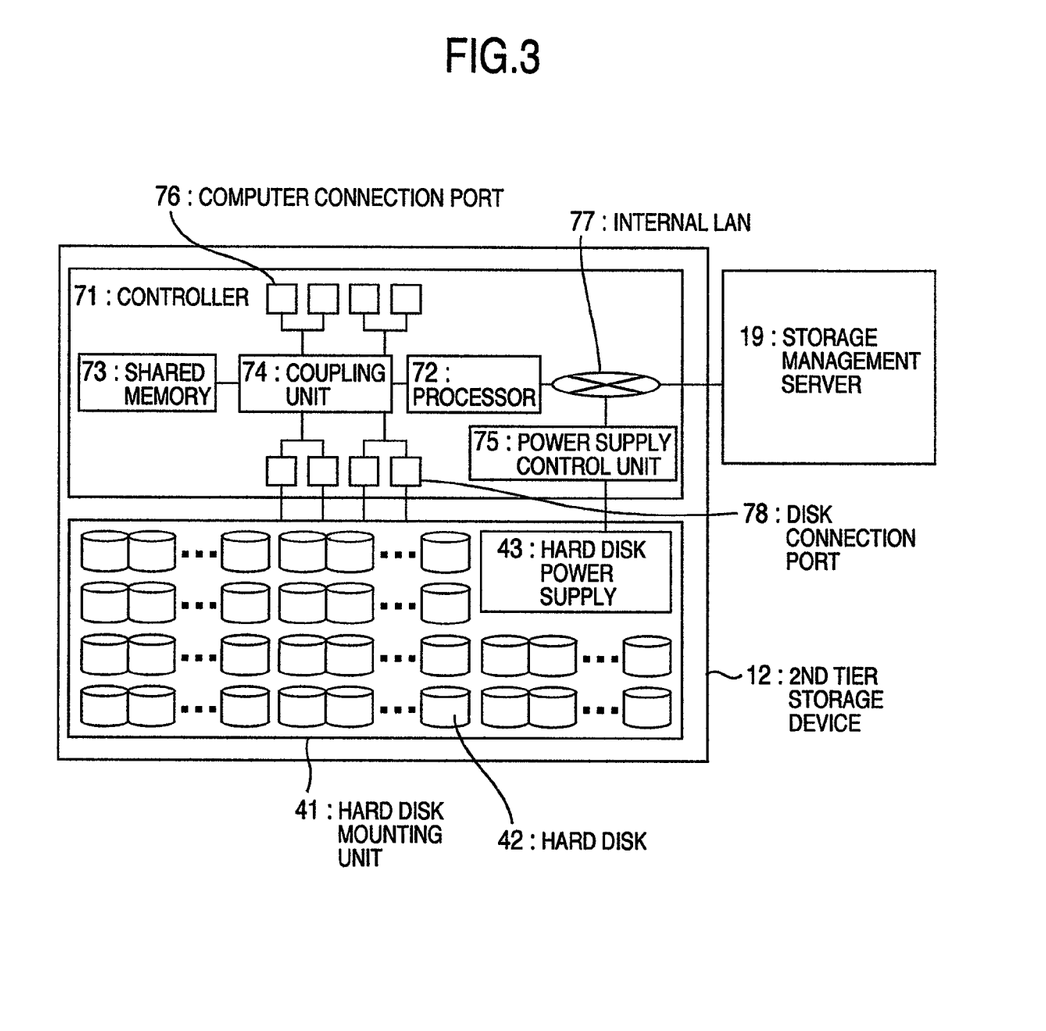
FIG. 3 is a constitutional diagram showing a 2nd tier storage device in the invention.

FIG. 3 is a constitutional diagram showing the 2nd tier storage device 12. A controller 71 has a computer connection port 76 connected with the high-order device such as the 1st tier storage device 11, a disk connection port 78 connected with the plurality of hard disks 42, a shared memory 73 for temporarily storing the write/read data to and from the hard disks 42, and a processor 72. The computer connection port 76, disk connection port 78, processor 72, and shared memory 73 are connected with each the other via a coupling unit 74. The coupling unit 74 is constituted by a switch in general, but may be constituted by a common bus.

The processor 72 controls a data transfer between the computer connection port 76 and shared memory 73 when it receives the data write/read access from the high-order device. The processor 72 also controls a data transfer between the hard disks 42 and shared memory 73 when the data write/read is performed to the hard disks 42. In this way, the data is exchanged between the computer connection port 76 and hard disks 42 via the shared memory 73 so that the data write/read is performed from the high-order device to the hard disks 42.

The processor 72 is connected to an internal LAN 77. The storage management server 19 resided outside the storage device is also connected to the internal LAN 77. Here, the constitution of the foregoing controller 71 is simply an example, which is not limited to the foregoing constitution. The controller 71 is acceptable if it has a function of performing the data write/read to and from the hard disks 42 in response to a data write/read request from the computers 14.

Further, the controller 71 may also have a power supply control unit 75 for controlling the power supply to turn the hard disks 42 on/off (supply/shutoff). In this case, the power supply control unit 75 is connected to the internal LAN 77.

The constitution of hard disk mounting unit 41 is the same as the constitution of the 1st tier storage device 11 shown in FIG. 2.

The file-storing second volume 52 described in FIG. 1 is provided on the area of RAID group (Gr.) constituted by the plurality of hard disks 42.

The constitution of the 1st tier storage device 11 and 2nd tier storage device 12 has been described in general with reference to FIG. 2 and FIG. 3, which is however not limited to the foregoing structure. The I/O processing performance demanded to the 1st tier storage device 11 should be better than that of the 2nd tier storage device 12. It is demanded, as specifications, that the 2nd tier storage device 12 can realize a capacity necessary for the computers 14 with less number of the hard disks 42 than the 1st tier storage device 11 can realize.

Figure 7:
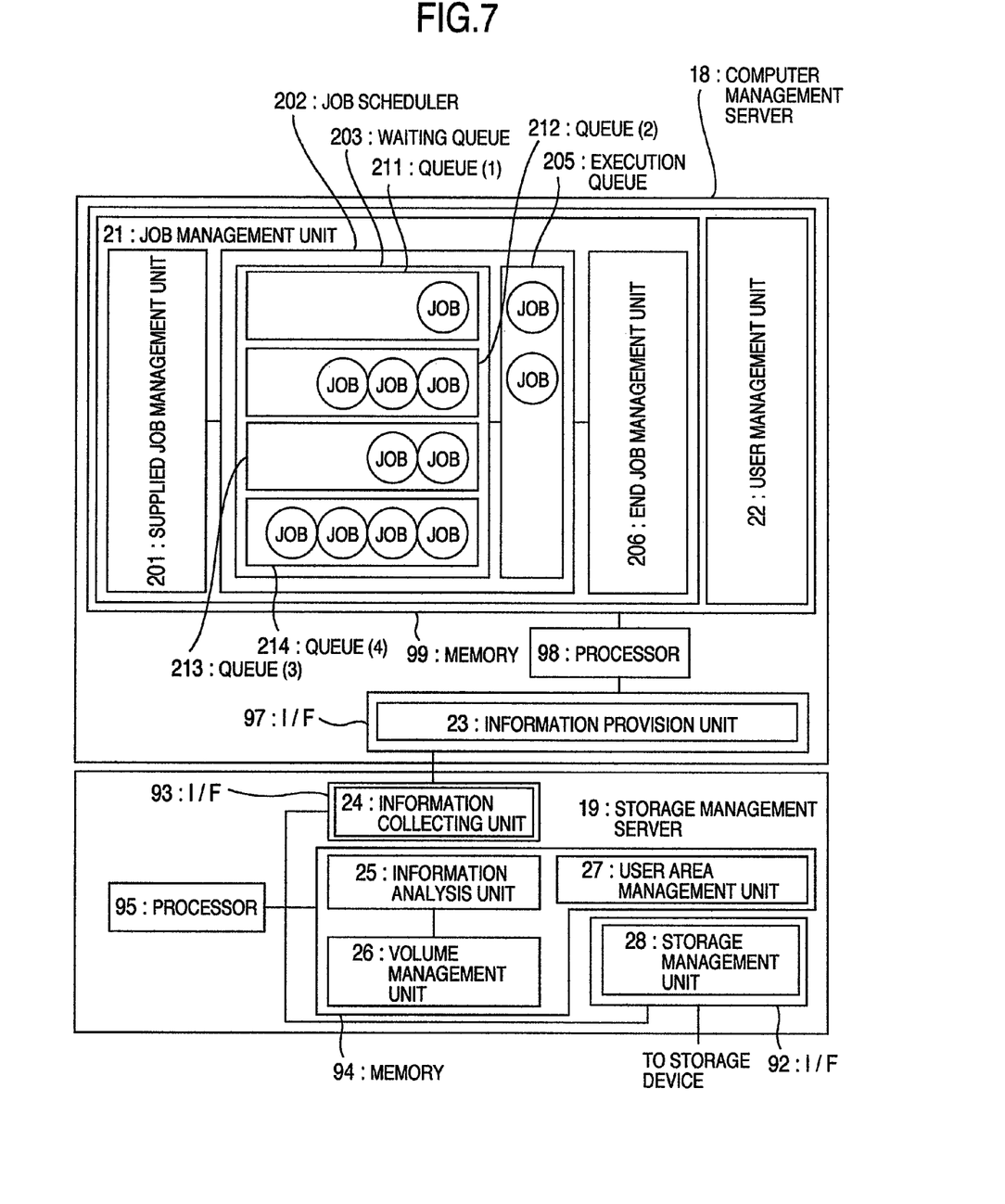
FIG. 7 is a constitutional diagram showing a computer management server and storage management server.

FIG. 7 illustrates functions of the computer management server 18 and storage management server 19.

The computer management server 18 has a job management unit 21 for managing jobs to be executed by the computers 14, a user management unit 22 for managing users which request the job to the computers 14, and a information provision unit 23 which becomes an interface for providing job information to be executed by the computers 14 to the storage management server 19.

In addition, the functional units such as job management unit etc., which is used for explaining constitutional elements in this embodiment, may be constituted logically by a software, or by a hardware such as a dedicated LSI. The functional units may also be realized by a combination of the software and hardware. In addition, in the case of logical constitution, the functional units are stored in a memory to execute them by a processor, so that the functions can be realized.

The job management unit 21 has a supplied job management unit 201, a job scheduler 202, and an end job management unit 206. Further, the job scheduler 202 has a waiting queue 203 and an execution queue 205.

Figure 9:
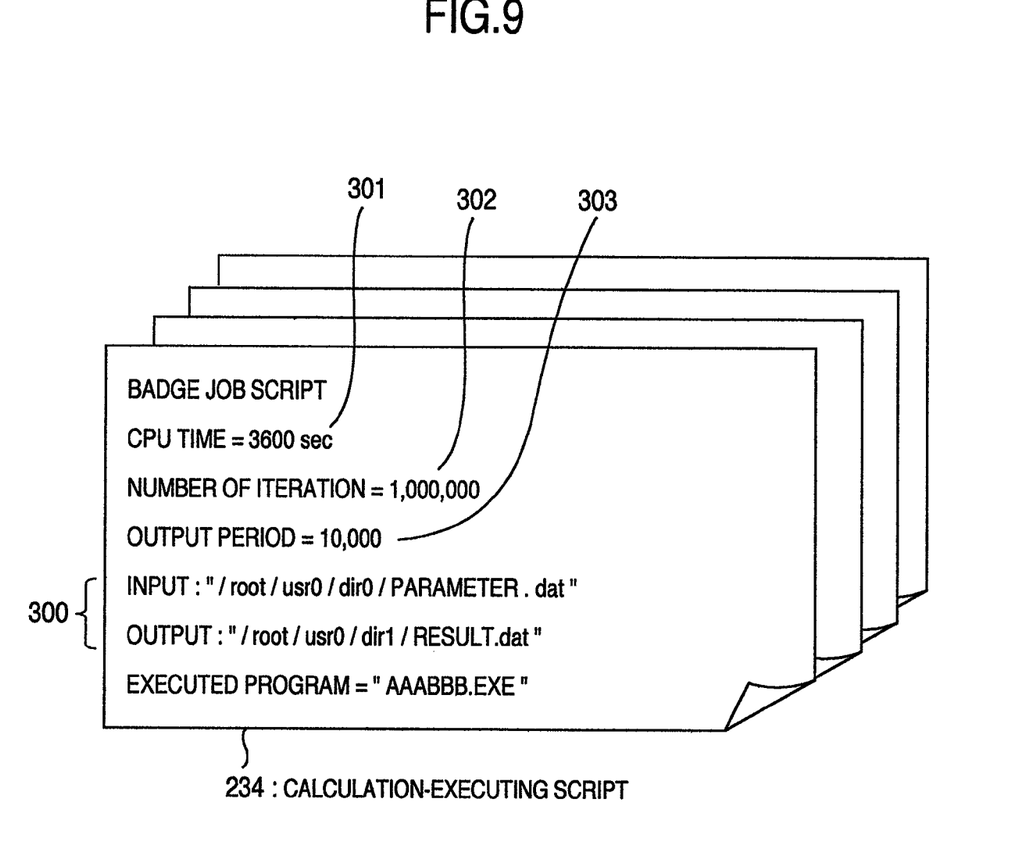
FIG. 9 is a diagram showing a computer executing script.

The user produces a calculation-executing script 234 shown in FIG. 9 to be inputted to the computer management server 18 so that a calculation job is executed by the computers 14. The foregoing input operation is performed directly to the computer management server 18, or via a client terminal connected with the computer management server 18 by a GUI (Graphical User Interface) or a CLI (Command Line Interface) provided by the computer management server 18, for example.

The calculation-executing script 234 which is inputted is managed by the supplied job management unit 201 and distributed to one of a queue (1) 211, a queue (2) 212, a queue (3) 213, and a queue (4) 214. These queues are provided with a high priority order in the waiting queue 203. The distribution method, or how to give a priority to the queues is determined by a calculation time period described in the calculation-executing script 234, and a judgment of sizes to be used in a main memory capacity. The user sometimes specifies explicitly a priority order in the calculation-executing script 234. The jobs are executed in order of the queues. Further, the jobs on the queues (1) 211 to (4) 214 are executed from a high order priority which is the queue (1) 211. After entering the execution of job having a high order priority on the queues, if a job having a subsequent priority is executable since an empty area is present in a CPU resource of the computer 14, the job is also executed in parallel on the empty area in the CPU. A job having a subsequent priority is executed in the same way. The job on the execution is managed by the execution queue 205, and the management for the job is transferred to the end job management unit 206 when the job is completed.

The user management unit 22 manages the users who use the computer 14 from the computer management server 18 and the client terminals connected with the computer management server 18, that is, manages user directories for storing user authentications and files used for the calculation by the users. For a purpose of performing the foregoing management, a protocol such as NIS (Network Information Service) and LDAP (Lightweight Directory Access Protocol), etc. is used.

Further, the information provision unit 23 transfers, to the storage management server 19, information indicative of the calculation-executing script 234 for the respective jobs and the execution order of the jobs, and information of the users which use the computers 14 and the use directory used by the users.

The storage management server 19 has: an information collecting unit 24 for receiving job information to be executed by the computers 14 from the information provision unit 23 in the computer management server 18; an information analysis unit 25 for performing an analysis so that the job information is used in the storage device; a volume management unit 26 for managing, on the basis of the analyzed information, a volume mount/unmount resided in the 1st tier storage device 11 and 2nd tier storage device 12 in connection with the user directories managed by the file server 13 and a file staging/destaging between the user directories; a user area management unit 27 for managing the user directory handled by the file server 13; and a storage management unit 28 for allocating volumes to the file server 13, 1st tier storage device 11 and 2nd tier storage device 12, and instructing the volume mount/unmount.

Next, a management process for the user directory will be described with reference to FIG. 4 to FIG. 6 in the execution of calculation by the user.

Figure 4:
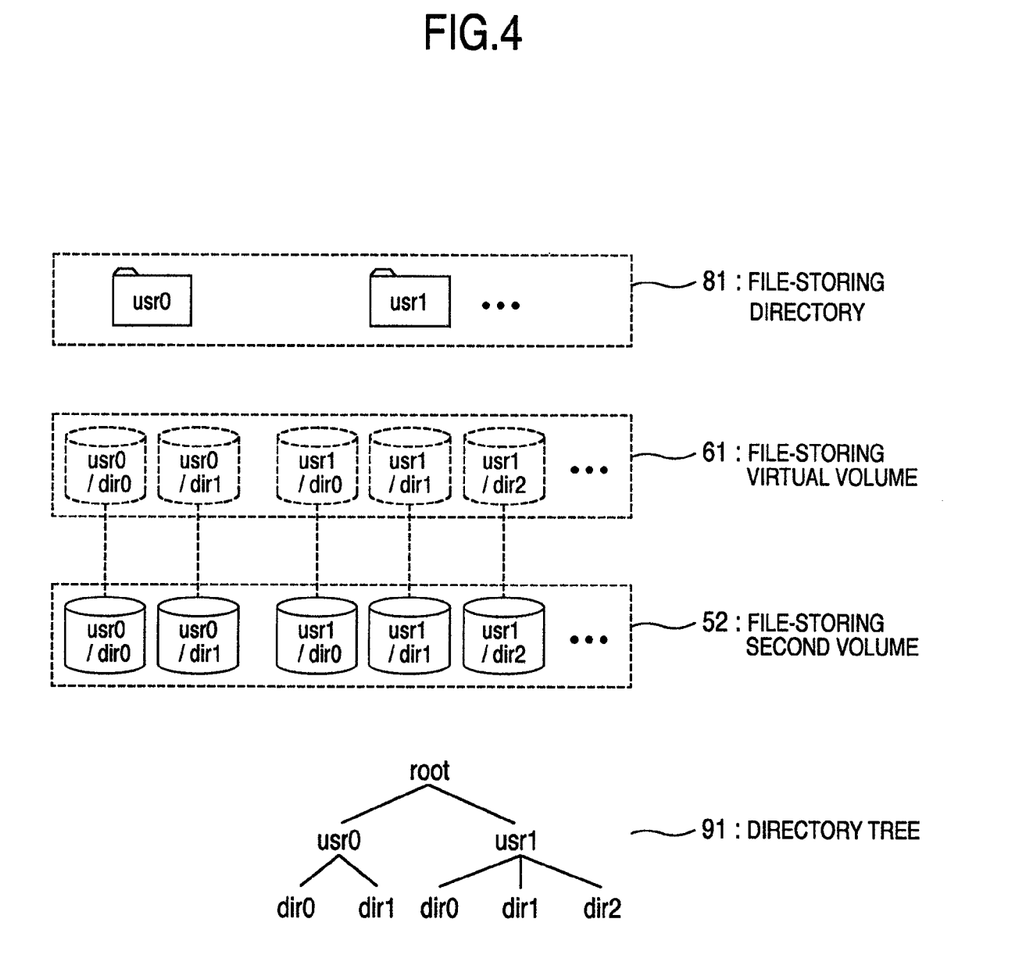
FIG. 4 is an explanatory diagram showing a corresponding relation of a file-storing directory, file-storing virtual volume and file-storing volume.

FIG. 4 is an explanatory diagram showing an example of relation between the user directory and volume before the user starts a calculation. Referring to FIG. 4, the file server 13 mounts a file-storing virtual volume 61 as a file-storing directory 81 which is a user directory, on the basis of the instruction from the storage management unit 28.

The controller 31 in the 1st tier storage device 11 virtualizes a file-storing second volume 52 in the 2nd tier storage device 12 as the file-storing virtual volume 61 in the 1st tier storage device 11 on the basis of the instruction from the storage management unit 28 and the 1st tier storage device 11 manages the file-storing virtual volume 61. In this way, the 1st tier storage device 11 can manage the volume of 2nd tier storage 12 collectively, so that the volume management can be simplified.

Here, the file-storing second volume 52 may be mounted directly as the file-storing directory 81.

A directory tree 91 shows an example of a relation between the user directory and file-storing second volume 52. Here, the file-storing second volume 52 which is distinct is allocated to each of the directories dir0 and dir1 under usr0, and to each of the directories dir0, dir1 and dir2 under user1. A corresponding relation (mapping) between the user directory and file-storing second volume 52 is managed by the user area management unit 27 resided in the storage management unit 19. The corresponding relation is formed or changed when the user transmits a request from the client terminal to be connected with the storage management server 19.

Figure 6:
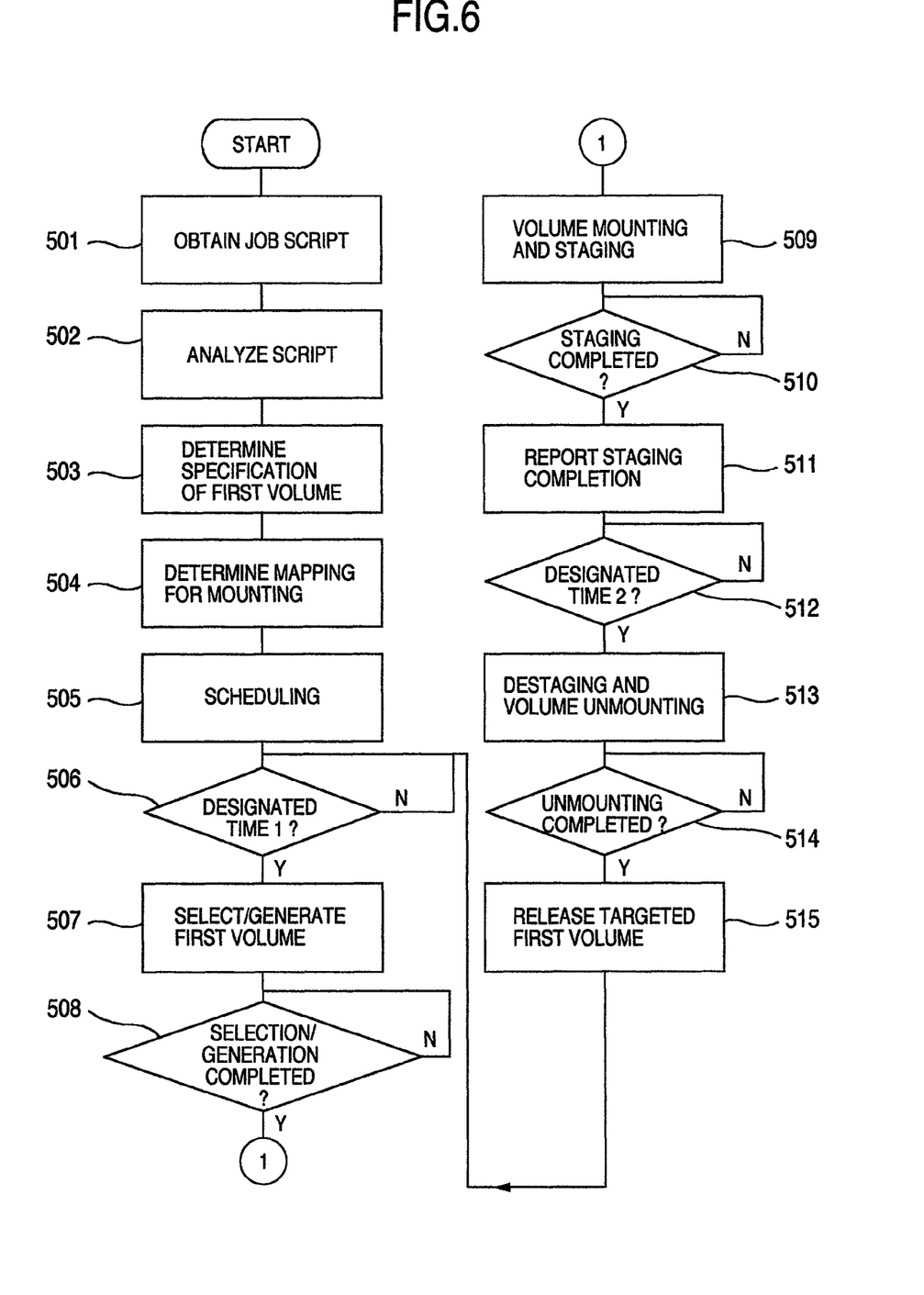
FIG. 6 is a flow chart showing a process of a staging and destaging for files among a file server, the 1st tier storage device and 2nd tier storage device.

FIG. 6 shows the file staging/destaging process in the tiered storage system. First, in a step 501, the information collecting unit 24 in the storage management server 19 receives all of the calculation-executing script 234 of jobs and information indicative of a job execution order resided in the waiting queue 203, from the information provision unit 23 in the computer management server 18.

Here, there are two methods to control the job execution order by the job scheduler 202: (1) a method of turning over a subsequently ordered job to the execution when the job execution is completed; and (2) a method of executing jobs in the order on the basis of a schedule in such a way that a plurality of jobs are supplied into the supplied job management unit 201, and an execution start time and execution end time of the respective jobs are scheduled from calculated times described in the calculation-executing script 234 for the plural supplied jobs.

According to the description above, in the case of section (1), the information collecting unit 24 receives the information from the information provision unit 23, Which includes all of the calculation-executing scripts 234 resided in the waiting queue 203 and a job execution order indicative the queue number and the job number of a specific calculation-executing script 234 in the waiting queue 203. The job is orderly numbered in the calculation-executing script 234 for every queue (the queue (1) to queue (4)) in the waiting queue 203. Here, the orderly numbered operation may be executed by the information provision unit 23, and a result of the operation may be transferred to the information collecting unit 24.

In the case of section (2), the information collecting unit 24 receives a table indicative of the execution start time and execution end time of the respective jobs scheduled by the computer management server 18 from the information provision unit 23.

Next, in a step 502, an analysis for the calculation-executing script 234 is performed.

Prior to describing the analysis, FIG. 9 shows an example of the calculation-executing script 234 describing information of an execution job (or calculation) executed by the computers 14. In this case, the plural users supply the calculation-executing scripts 234, therefore, FIG. 9 shows an image of a plurality of calculation-executing scripts. In order to manage of scheduling the volume amount/unamount resided in the 1st tier storage device 11 and 2nd tier storage device 12 in connection with the user directory managed by the file server 13, scheduling the file staging/destaging between the user directories, and the user directory handled by the file server 13, the calculation-executing script 234 includes directory information 300 for storing calculation parameters and calculation executed results at least.

Further, it is desirable that the calculation-executing script 234 includes a calculation-executing time (CPU TIME) 301, number of times of calculating iteration 302, and a period of number of times of iteration 303 for outputting the calculated result. According to the information described above, it is possible to accurately obtain a time of outputting the files by the computer 14.

Here, the format of calculation-executing script 234 shown in FIG. 9 is simply an example, which is not limited thereto. The calculation-executing script 234 is acceptable if it includes the foregoing information at least.

The information analysis unit 25 extracts a calculation time, a directory of input/output files, and a characteristic of the files to be inputted/outputted. Here, the characteristic of files means a file size and the number of files, for example.

Next, in a step 503, the volume management unit 26 determines a specification necessary for the file-storing first volume 51 for storing files used for a calculation from the characteristic of files. An example of a determining method for the specification will be described below.

As an example, in the case where a file size used for the calculation is larger than a predetermined file size (for example, the file size is equal to or greater than 1 TB), the number of hard disks constituting a volume used by the calculation is set to the maximum number of hard disks (for example, 16 units) which is feasible to provide in the 1st tier storage device 11. In this case, the file-storing first volume 51 to be provided is tentatively set to tmp0, and the number of hard disks constituting the volume 51 is set to as a specification of tmp0.

The files are straddled over all of the hard disks constituting the volume to be stored in the hard disks. Therefore, the number of hard disks constituting the volume is increased so that a parallel degree for reading out the files can be improved, thereby enhancing a throughput of reading out the files.

As another example, in the case where the number of files is greater than a predetermined number, the number of file-storing first volume 51 is set to a number equal to or greater than a predetermined number which is set to every number of files. For example, in the case where the number of files is equal to or greater than 1000 pieces, the number of file-storing first volume 51 is set to a hundredth (1/100) of the number of files. Here, the number of file-storing first volume 51 is set tentatively to eight pieces, and it is set to tmp1 to tmp8.

This is because when all of the files are stored in one volume, for example, a read-out throughput becomes a bottleneck relative to the files in the volume. However, the files are dispersedly stored in a plurality of volumes which are previously determined in response to the number of files, so that the read-out throughput can be improved.

Here, it is needless to say that a capacity of each volume (tmp0 to tmp8) for the two foregoing cases should be larger than a total size of all files which are stored in each of the volumes.

Next, in a step 504, the volume management unit 26 determines a corresponding relation (mapping) between the file-storing directory 81 and file-storing first volume 51 (temp0 to tmp8).

The corresponding relation will be described with use of FIG. 5, as an example. FIG. 5 shows that the file-storing first volume 51 is added to the corresponding relation between the file-storing directory 81 and the file-storing second volume 52, both of which are used for the user prior to the start of calculation as described in FIG. 4. Here, a relation of tmp0 to tmp8 is added as the file-storing first volume 51. Referring to a directory tree 92 in FIG. 5, they are mounted as tmp0 under the directory usr0 by the file server 13 and the volumes tmp1 to tmp8 under the directory usr1 by the file server 13.

That is, files larger than a predetermined file size which used in calculation by the usr0 is stored in the file-storing second volume usr0/dir0, therefore, the tmp0 is mounted to the directory tmp0 under vdir0, as the file-storing first volume 51 in the 1st tier storage device 11 storing the foregoing files.

Further, the number of files to be used for the calculation by the user usr1 is greater than the predetermined number of files, and these files are stored in the file-storing second volume usr1/dir0 to dir2. The tmp1 to tmp8 are mounted to tmp1 to tmp8 under three directories vdir0 to vdir2, as the file-storing first volume 51 in the 1st tier storage device 11 storing the foregoing files.

In this case, in order to distinguish clearly the corresponding relation between the directory mounting the file-storing second volume and the directory mounting the file-storing first volume, the directory for the corresponding file-storing first volume is set to vdir0 to vdir2 in the case where the file-storing second volume is set to dir0 to dir2, when both the first and second volumes store the same files. In this regard, naming the directories is not necessary as described above if both the first and second volumes are managed clearly as the corresponding relation.

Next, in a step 505, the volume management unit 26 schedules a time of a selection and generation of the file-storing first volume, the specification of which is determined by the step 503, and a time of mounting the file-storing first volume to the user directory.

A determining method of the mount/unmount time is defined by controlling the execution order of the jobs by the job scheduler 202. In this case, there are two methods of controlling the execution method of jobs by the job scheduler 202: (1) a subsequently ordered job is turned over to execution when the execution of job is completed; and (2) a plurality of jobs are supplied to the supplied job management unit 201, an execution start time and execution end time of the respective jobs are scheduled from a calculated time described in the calculation-executing script 234 of the supplied jobs, and the jobs are executed in the order on the basis of the schedule.

In the case of the section (1), a staging time period for files is calculated so that the file is used for the calculation by the job as a target resided in the queue, and a time period required for the calculation of the previous job from the present job is checked. Here, the staging time period of the files is dependent on the number of files to be made the staging. The staging time period is set, expecting a margin, for example, 10% greater than a calculated time period that is calculated by the respective file sizes and a data transfer throughput from the 2nd tier storage device 12 to the 1st tier storage device 11. The mount time period is not determined if the staging time period is shorter than the calculated time period of the previous job. The previous job is turned over to the execution, and information indicating that the execution is started is then reported to the volume management unit 26 by the computer management server 18. When the staging for the files of the previous job is completed, information indicating that the staging is completed is then reported to the volume management unit 26 by the computer management server 18 if the staging time period is longer than the calculated time period of the previous job. In this case, there is sometimes no completion of staging the files of job dependent on the time period required for the calculation of job, even though the previous job is completed. In such case, the job cannot be executed. For a purpose of preventing such a situation, the storage management server 19 reports, information indicating whether the staging for the necessary files is completed, to the computer management server 18. The computer management server 18 checks whether the staging for the files necessary for the job execution is completed on the basis of staging completion information transmitted from the storage management server 19, prior to the execution for the respective jobs. The computer management server 18 also controls so that the job is executed if the staging is completed, and executed after the staging is completed if the staging is not completed.

In addition, an unmount time period is set to a time added the calculated time period of the job to a time when the job is turned over to an execution. Therefore, in the case of section (1), the unmount time period is determined after the job execution is started.

In the case of section (2), the volume management unit 26 obtains the execution start time and execution end time of the respective jobs from the foregoing information received from the computer management server 18. Therefore, a mount start time is set before a certain time from the execution start time of the job, in which the certain time is dependent on the number of files to be made the staging. The certain time is set, expecting a margin, for example, 10% greater than a calculated time period that is calculated by the respective file sizes and a data transfer throughput from the 2nd tier storage device 12 to the 1st tier storage device 11.

The unmount time period is set after a certain time from the execution end time of the job. The certain time is a time required for outputting a calculated result of the job, that is, a value previously determined by a write throughput of the 1st tier storage device 11 for each of the file sizes and a value calculated from the file size.

In a step 506, a process awaits until a time is turned to a designated time (clock time) 1. In the case of section (1), the designated time 1 is not determined in advance. The designated time 1 becomes a timing when the previous job reported from the computer management server 18 is turned over to an execution or the staging of the files in the previous job is completed. In the case of section (2), the designated time 1 becomes an earlier time by a time required for a process of the selection or generation of the file-storing first volume 51 than the time determined by the step 505. Here, the process judges whether a necessarily specified volume is resided in the 1st tier storage device 11. "A selection time" is required if the volume is resided, and "a time required for a generation process" is required if the volume is not resided.

In a step 507, when the designated time 1 comes, the volume management unit 26 instructs the 1st tier storage device 11 to select and generate the file-storing first volume 51, the specification of which is determined in the step 503, through the storage management unit 28.

Next, the storage management unit 28 checks a completion of either the selection or generation of the volume in a step 508. The process moves to a step 509 if the completion is made.

In the step 509, the volume management unit 26 instructs the file server 13 via the storage management unit 28 to mount the file-storing first volume 51 selected and generated by the step 507 to the user directory and stage the files to be used for the job, in accordance with the directory tree determined by the step 504. The file server 13 executes the mount, and stages the files to be used for the job after the mount is completed.

Figure 5:
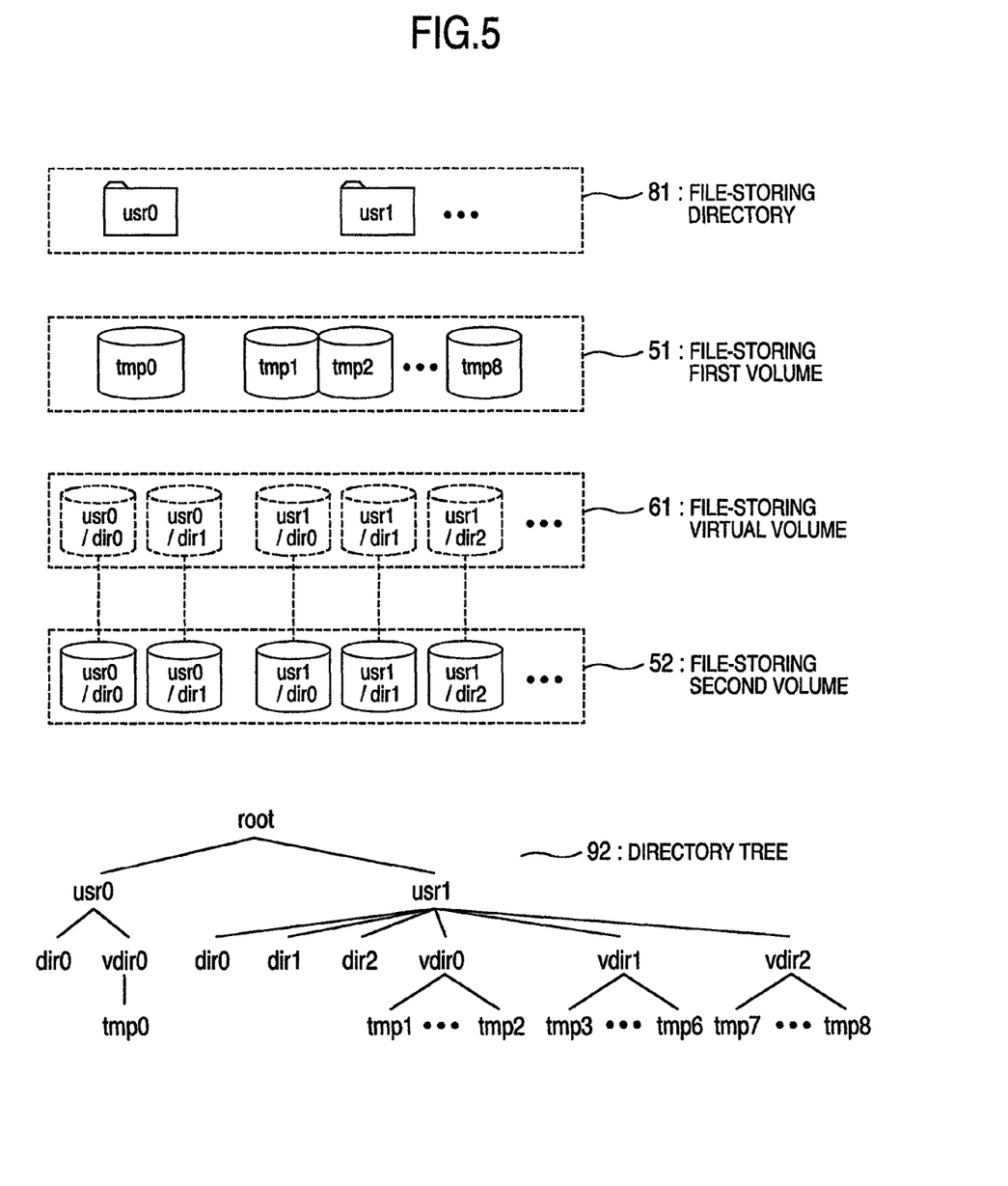
FIG. 5 is an explanatory diagram showing a corresponding relation of the file-storing directory, the file-storing virtual volume, a file-storing first volume, and a file-storing second volume.

In the case of the example described in FIG. 5, the staging is executed so that the files of usr0/dir0 are copies to usr0/vdir0/tmp0. Further, the staging is executed so that the files of usr1/dir0 are dispersedly copied to usr1/vdir0/tmp1, tmp2, the files of usr1/dir1 are dispersedly copied to usr1/vdir1/tmp3 . . . tmp6, and the files of usr1/dir2 are dispersedly copied to usr1/vdir2/tmp7, tmp8.

In a step 510, the storage management unit 28 checks a staging completion report from the file server 13, and the process moves to a step 511 if the completion report is present.

In the step 511, the storage management unit 28 reports the staging completion of the files required for the job to the computer management server 18 via the information collecting unit 24.

Next, in a step 512, the process await until a designated time (clock time) 2 comes. In the case of section (1), the designated time 2 is determined after the job is executed, as described above, and set to a time added the calculated time period of the job to a time when the job is turned over to an execution. Here, the destaging for the files and unmount for the volumes cannot be performed when the job is not completed even at the designated time 2, for example, the time required for the calculation is extended from a scheduled time. For this reason, the completion report of the job is adapted to receive from the computer management server 18. On the basis of the information, the job is checked whether it is completed when the designated time 2 comes. The process in a step 513 waits for an execution until the storage management server 19 receives the completion report of the job if the job is not completed. In the case of section (2), the designated time 2 becomes the time determined by the step 505. Here, if the job is not completed even at the designated time 2, the same process is executed as the section (1).

In the step 513, the storage management unit 28 instructs the file server 13 to destage the files when the designated time 2 comes, and the file server 13 performs the destaging in accordance with the instruction. That is, the files are copied as the copy source directory described by the step 509 is a copy destination directory, and the copy destination directory is a copy source. The file server 13 then unmounts the file-storing first volume 51 from the user directory when the destaging of the files is completed, and returns the user directory to a state as shown in FIG. 4. In a step 514, the storage management unit 28 checks an unamount completion report from the file server 13. The process moves to a step 515 if the storage management unit 28 receives the unamount completion report.

In the step 515, the storage management server 19 releases the file-storing first volume 51 which is unmounted, for a file-storing volume to be used for the other jobs. After that, the process is repeated from the step 506 to the step 515.

According to the embodiment, necessary files can be staged to the 1st tier storage device 11 when a job requires the files in an execution by the computers 14, therefore, it is possible to speed up an input/output of the files to and from the computers 14 with use of the high performance of 1st tier storage device 11. Further, it is possible to minimize the capacity of 1st tier storage device 11, therefore, the cost of storage system can be reduced.

In the embodiment, the file-storing first volume 51 is unmounted, but not released until the job execution is completed in the computers 14 and the outputted files are destaged, after the file-storing first volume 51 for the job is mounted as a user directory.

However, in the process shown in FIG. 6, the file-storing first volume 51 may be unmounted from the directory, and that volume may be secured as a file-storing first volume 51 to be used by the other jobs and mounted to the other user directories, after the storage management server 19 reports the staging completion to the computer management server 18 in the step 511, and the computer 14 reads out the files from the user directory. In this case, a newly required volume may be secured and that volume may be mounted to the user directory, before the job using the user directory which unmounts the volume is completed.

Further, respective directories and volumes used for the input files and the output are separately provided in advance. The input volume is unmounted from the input directory after the execution of the job is started, and the input volume may be released for the other jobs.

Further, in the case of the designated time 1, the input directory and volume are provided alone in advance. The input volume may be unmounted from the input directory, and that volume is released for the other jobs, after the execution of job is started. The output volume may be secured prior to the designated time 2, and that volume may be mounted to the output directory.

According to the foregoing control, the capacity required for the 1st tier storage device 11 can be further reduced, thereby enabling the storage system 2 to reduce its cost.

If the output volume cannot be secured since the capacity of 1st tier storage device 11 is insufficient at the designated time 2, the files for the job are written directly in the user directory which mounts the file-storing second volume 52 for storing the job files of the 2nd tier storage device 12, so that the insufficient capacity of the 1st tier storage device 11 can be avoided. Next, a storage system 2 in this embodiment will be described with use of an example of a method for reducing a power consumption in FIG. 10. In this method, a power supply of the hard disk 42 which constitutes the volumes storing the files relative to the 2nd tier storage device 12 is only turned to on-state at a time of staging and destaging the files in relation to the execution job between the 2nd tier storage device 12 and 1st tier storage device 11. Except for the foregoing time, the power supply of the hard disk 42 which constitutes the volumes, the files of which are not subject to the staging and destaging, is turned to off-state.

Figure 10:
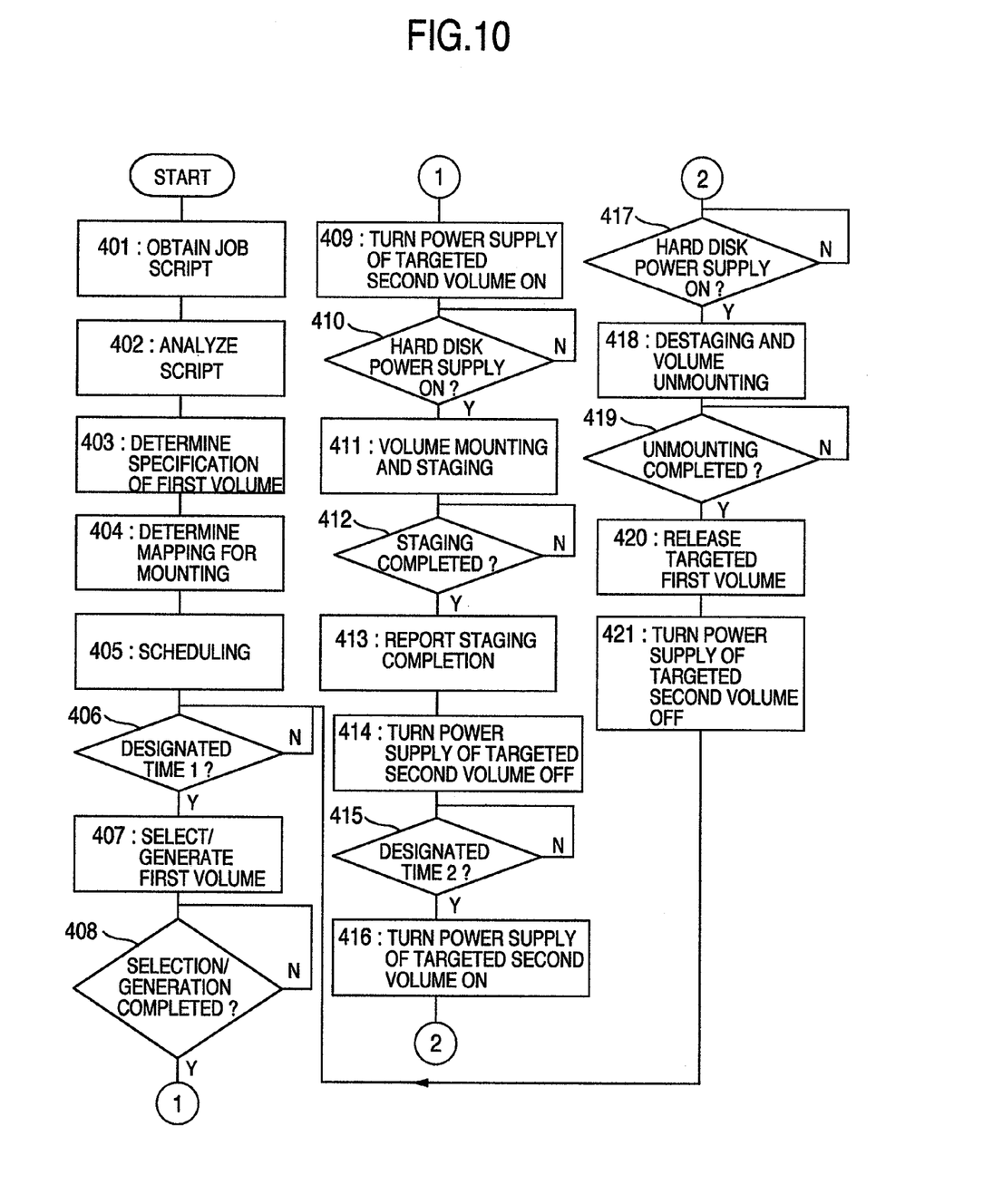
FIG. 10 is a flow chart of another process of a staging and destaging for files among a file server, the 1st tier storage device and 2nd tier storage device.

FIG. 10 shows a process of the foregoing method. The basis flow of the process is the same as that shown in FIG. 6, but different process will be described below.

Prior to executing a step 411 (corresponding to the step 509 in FIG. 6), in a step 409, the storage management server 19 outputs an instruction to the 2nd tier storage device 12 to turn the power supply of the hard disk 42 on-state, in which the hard disk 42 constitutes the file-storing second volume 52 storing files which are targeted to the staging. The storage management server 19 has a table indicating a corresponding relation between the file-storing second volume 52 and the hard disk 42 constituting the volumes thereof.

In a step 410, the storage management server 19 checks the completion report of the on-state of power supply to be supplied to the hard disk 42 from the 2nd tier storage device 12, and moves the process to the step 411 when it receives the completion report.

After a step 413, the storage management server 19 outputs an instruction to the 2nd tier storage device 12 to again turn the power supply of hard disk 42 off-state in a step 414, in which the hard disk 42 constitutes the file-storing second volume 52 storing the files, the staging of which is completed.

Next, in a step 416, the storage management server 19 outputs an instruction to the 2nd tier storage device 12 to again turn the power supply of the hard disk 42 on-state, in which the hard disk 42 constitutes the file-storing second volume 52 relative to the job, when the designated time 2 comes.

In a step 417, the storage management server 19 checks the completion report of the on-state of power supply supplied to the hard disk 42 from the 2nd tier storage device 12, and the process moves to a step 418 when it receives the completion report.

After a step 420, in a step 421, the storage management server 19 outputs an instruction to the 2nd tier storage device 12 to again turn the power supply of the hard disk 42 off-state, in which the hard disk 42 constitutes the file-storing second volume 52 storing the files, the destaging of which is completed. Thereafter, the process is repeated from a step 406 to the step 421.

Furthermore, after the step 413, the storage management server 19 may output an instruction to the 1st tier storage device 11 to turn the power supply of the hard disk 42 off-state, in which the hard disk 42 constitutes the file-storing first volume 51 used to store the files after the computer 14 read the input files. In this case, after the step 416, the storage management server 19 outputs an instruction to the 1st tier storage device 11 to again turn the power supply, which was once turned to off-state, of the hard disk 42 on-state. The storage management server 19 has a table indicating a corresponding relation between the file-storing first volume 51 and the hard disk 42 constituting the volume thereof.

This enables the storage system to further decrease the power consumption, compared with a case where the power supply of the hard disk 42 in the 2nd tier storage device 12 is only turned to off-state.

Other steps 401 to 405, 407, 408, 412, 415, 418, and 419 are similar to the steps with the same descriptions in FIG. 6.

Second Embodiment

A second embodiment of the invention will be described below.

Figure 8:
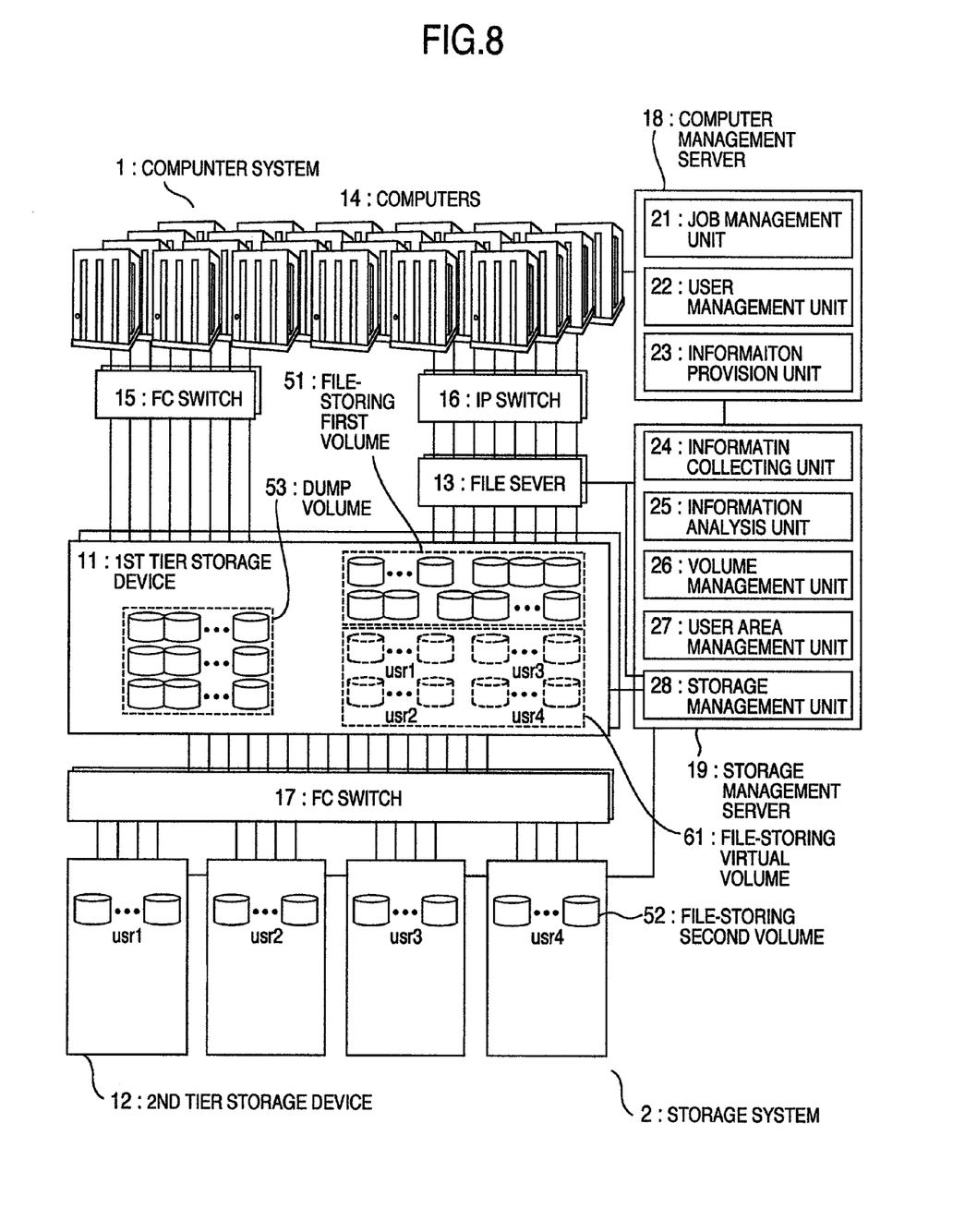
FIG. 8 is a constitutional diagram showing a storage system connected with computers and management servers in a second embodiment of the invention.

FIG. 8 is a constitutional diagram showing a storage system including storage devices of the second embodiment. The storage system in FIG. 8 is the same as that shown in FIG. 1 except for the following constitutions.

That is, the 1st tier storage device 11 has a dump volume 53 which is connected with the computers 14 via a FC switch 15.

In the storage system of this embodiment, contents of main memories (data to be used by the processors on calculations) of all of the processors being used in the job executions by the computers 14 are written periodically in the dump volume 53 without change on the job execution. A timing when the contents of the main memory are written in the dump volume 53 is referred to as a checkpoint. In this way, the contents of the main memory in the processor to be used for the calculation for every checkpoint are written in the dump volume 53 so that the main memory stored contents written in the dump volume 53 immediately before the checkpoint are written in the memory of the computer 14, when the job execution halts by causing a failure of the computer. Therefore, it is possible to restart and continue the calculation from a time point immediately before the checkpoint.

In the case where the foregoing process is not performed, it is necessary to restart the calculation from the beginning when the job execution halts by causing the failure of the computer. This causes a waste of time for the calculation time.

In the case of the storage system which performs the foregoing process, it is necessary to provide the dump volume 53 in the 1st tier storage device 11, the other than the input/output volume (file-storing first volume 51) used for the files to the computers 14. Therefore, a large capacity is necessary in comparison with a case where the dump volume 53 is not provided. This causes the storage system 2 to increase the cost. In order to prevent the cost increase, an allocation is performed for the damp volume 53, as described below.

The number of volume and its capacity to be secured by the dump volume 53 is determined on the basis of information which is received by the storage management server 19 from the computer management server 18, in which the information includes the number of times of writes, or the number of times of checkpoints, according to which data stored in the main memory to be used for the calculation in the computer 14 and the main memories of the computers 14 is written in the dump volume 53. For example, the capacity of dump volume 53 is set to (main memory capacity)×(number of checkpoints), in the case where the contents in the main memory at all of the checkpoints are written in a volume as a single piece of the dump volume 53. Further, the capacity of dump volume 53 is set to a capacity having to the extent of 5% larger than the main memory capacity so that it is either equal to the main memory capacity or larger with a margin, for example.

Next, an allocation method for the dump volume 53 will be described below. The method is realized by performing the 1st tier storage device 11 on the basis of an instruction from the storage management server 19. The allocation to the file-storing first volume 51 is prioritized, and the remaining volumes are then allocated to the dump volume 53 in the case where the volumes are allocated by the 1st tier storage device 11. This is because the file-storing first volume 51 is a volume for storing the files required for the job execution, and the job cannot execute without securing that volume.

Allocation of the volumes is done as described above. If the capacity exceeds the maximum capacity of 1st tier storage device 11 when the calculated number of dump volumes 53 and the capacity of the respective volumes are secured for the checkpoints and calculations based on the main memory, a report is sent to the user via the computer management server 18 which demands to set a new value for the number of times of the checkpoints.

Or the maximum number of dump volumes 53 is allocated that the remaining volumes can allocate, without providing the necessary number of dump volumes 53. Data of a new checkpoint is overwritten on the dump volume 53 storing data of the earliest checkpoint when the dump volumes 53 which are provided on the calculation is used up. In this case, the execution of the foregoing process may be reported to the user via the computer management server 18, and the user may select whether the process is executed or the number of checkpoints is set again.

More specifically, the number of dump volumes 53 is set to 2 to 3 pieces, and the volumes in a range of the pieces may be used repeatedly. That is, the data of the new checkpoint is overwritten on the volume of the early checkpoint when the number of volumes is short.

Further, the foregoing three allocation methods are indicated to the user in the beginning, the user may then select one of the methods.

In the case where the calculation start time and end time of the job are known in advance and the calculation time period is long in comparison with a time period required for the allocation to the other volume and the mount/unmount to the user directory, the file-storing first volume 51 used for storing the input files is unmounted from the user directory and may be allocated to the other dump volume 53. In this case, the dump volumes 53 equal to a necessary amount of volumes for storing the output files of the job are released, and an allocation to volumes is again performed as volumes for storing the output files to be mounted as the user directory, prior to the certain time earlier than the calculation end time.

In this way, it is possible to reduce the capacity required for the 1st tier storage device 11. This enables the storage system 2 to reduce the cost.

Here, the contents in the main memory at the checkpoint when they are stored in the foregoing dump volumes 53 may be destaged to the dump volume 53 provided in the 2nd tier storage device 12 at a checkpoint specified by the user. In this way, the calculation time period can be made short, when a calculation is again executed from a certain checkpoint after completing the calculation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage system, comprising:
a plurality of computers:
a file server connected with the plurality of computers that includes a job management unit;
a first storage device connected with the file server and having a first volume;
a second storage device connected with the first storage device and having a second volume; and
a management device connected with the file server, the first storage device and the second storage device, that includes an information collecting unit and an information analysis unit, wherein
the job management unit manages jobs in the plurality of computers,
the information collecting unit collects calculation-executing job information of the computers from the job management unit,
the information analysis unit analyzes the collected calculating-executing job information,
extracts a characteristic of files including a file size and a number of files to be inputted and outputted in accordance with the analyzed calculation-executing job information, and selects, if the extracted file size is larger than a predetermined value, volumes constituted by a magnetic disk device whose number is equal to or greater than a predetermined number of disks, and if the extracted number of files is larger than a predetermined value, volumes whose number is equal to or greater than a predetermined number of volumes, as the first volume storing files,
the file server mounts the first volume as a first directory at a predetermined first timing,
copies files in the second directory into the first directory,
copies predetermined files in the first directory into the second directory at a predetermined second timing, and
unmounts the first directory at the second timing.

2. The storage system according to claim 1, wherein the file server mounts a plurality of first volumes which are selected, as respectively separated first directories, and copies dispersedly the plural files stored in the second volume into the first directories.

3. The storage system according to claim 1, wherein
the information analysis selects a third volume different from the first volume as a file-storing volume for outputting a calculated result at a predetermined time earlier than the second timing, and
the file server mounts the third volume as a third directory.

4. The storage system according to claim 1 further comprising, means that shuts off a power supply of a magnetic disk device constituting the second volume, after the first volume is mounted as the first directory, and predetermined files in the second directory are copied into the first directory at the first timing.

5. The storage system according to claim 1 further comprising, timing determination means that determines the first and second timings, wherein the timing determination means selects a timing as the first timing when a previous job from a job reported by the management device is turned over to an execution.

6. The storage system according to claim 1 further comprising, timing determination means that determines the first and second timings, wherein the timing determination means selects a timing as the first timing when a staging of files for a previous job from an execution targeted job is completed.

7. The storage system according to claim 1 further comprising, timing determination means that determines the first and second timings, wherein the timing determination means selects a timing as the first timing which is an earlier time required for a selection or generation of a file-storing first volume than an execution predetermined time of an execution targeted job.

8. The storage system according to claim 1 further comprising, timing determination means that determines the first and second timings, wherein the timing determination means selects a timing added a job calculated time period to an execution start time of an execution targeted job.

9. The storage system according to claim 1, wherein the first storage device further has a third volume, and
wherein the management device includes means that calculates number and capacity of the third volumes in accordance with a main memory capacity used for calculations in the computer and number of times of writing data stored in the main memory in the computer in the third volume, from the calculation-executing job information reported from the management device.

10. The storage system according to claim 9, wherein the management device allocates the first volume, thereafter, remaining volumes thereof as the third volume, in the allocation of the volumes in the first storage device.

11. The storage system according to claim 4, wherein the file server includes means that unmounts the first volume after the computer reads out targeted files from the first directory, and the storage system includes means that shuts off the power supply of the magnetic disk device constituting the unmounted first volume.

12. The storage system according to claim 10, wherein the management device instructs the computer to again set number of times of writing in the third volume in a case where a capacity of the remaining volumes is short of a total capacity required for the third volume calculated from the calculation-executing job information.

13. The storage system according to claim 10, wherein the management device allocates the third volume in a range of the remaining volumes in a case where the capacity of the remaining volumes is short of the total capacity required for the third volume calculated from the calculation-executing job information, and removes an earliest data in a case where data is not written in the third volume by causing a capacity shortage on job execution.

14. The storage system according to claim 10, wherein the file server unmounts the first volume after starting a calculating execution, and the management device allocates the unmounted first volume as the third volume.

15. The storage system according to claim 14, wherein the management device allocates newly the third volume as the first volume before completing the calculation, and the file server mounts again the newly allocated first volume as the first directory.

* * * * *